United States Patent

Som et al.

[11] Patent Number: 5,961,220
[45] Date of Patent: Oct. 5, 1999

[54] SWING-ASIDE BEARING DEVICE FOR A SOCKET

[75] Inventors: Michiel Johannes Maria Som, Geertruidenberg; Christiaan Arie Tromp, Krimpen Aan De Lek, both of Netherlands

[73] Assignee: Scambia Industrial Developments Aktiengesellschaft, Schaan, Liechtenstein

[21] Appl. No.: 08/974,426

[22] Filed: Nov. 19, 1997

[30] Foreign Application Priority Data

Nov. 19, 1996 [NL] Netherlands ............................ 1004567
Jul. 10, 1997 [NL] Netherlands ............................ 1006535

[51] Int. Cl.$^6$ ........................................................ F16C 11/10
[52] U.S. Cl. ................................... 384/416; 16/330; 403/87
[58] Field of Search ........................ 384/276, 295, 384/299, 396, 416; 16/330, 334; 403/87, 91, 92, 96

[56] References Cited

U.S. PATENT DOCUMENTS

| 3,586,355 | 6/1971 | Magi .......................................... 403/91 |
| 4,867,494 | 9/1989 | Castiglioni ............................. 16/330 X |
| 5,109,571 | 5/1992 | Ohshima et al. ..................... 16/330 X |
| 5,190,390 | 3/1993 | Ming-Tai ............................... 16/334 X |

FOREIGN PATENT DOCUMENTS

| 87 12 103 | 10/1987 | Germany . |
| 424 496 | 5/1967 | Switzerland . |

*Primary Examiner*—Thomas R. Hannon
*Attorney, Agent, or Firm*—Young & Thompson

[57] ABSTRACT

A bearing device for a socket for providing an electrical connection between a towing and a towed vehicle has a base bearing element which can be mounted at the level of the rear bumper on the towing vehicle, and also a bearing element for the socket which is rotatable relative to the base bearing element. The base element and the rotatable bearing element are interconnected by a plastic hinge.

15 Claims, 5 Drawing Sheets

SWING-ASIDE BEARING DEVICE FOR A SOCKET

BACKGROUND OF THE INVENTION

The invention relates to a bearing device for a socket for providing an electrical connection between a towing and a towed vehicle, which bearing device has a base bearing element which can be mounted at the level of the rear bumper on the towing vehicle, and also a bearing element for the socket which is rotatable relative to the base bearing element.

DESCRIPTION OF THE RELATED ART

Such bearing devices are known. When the socket is not in use, it can be swung aside until it is underneath the rear bumper. The advantage of this is that it is then no longer visible. However, both in the swung-out and in the swung-in position, the bearing device is situated in a position in which it is exposed to all kinds of influences, such as splashing water, dust and the like. It is found that the known bearing device, in particular the hinge thereof, is soon adversely affected by such influences. The functioning of the hinge can consequently deteriorate. Furthermore, it can be attacked by rust, in particular in the event of wear of the surface layer of the metal parts of the hinge connection.

SUMMARY OF THE INVENTION

The object of the invention is therefore to provide a bearing device of the abovementioned type which does not have these disadvantages. That object is achieved by the fact that the base element and the rotatable bearing element are interconnected by a plastic hinge.

The plastic hinge has the advantage that it has better resistance than metal to the hostile conditions to which the bearing device is exposed. Moreover, the plastic hinge parts remain readily rotatable relative to each other for a long time, even in the absence of lubrication.

The plastic hinge can have two parallel rotating plates, one of which is fixed to the base element, and the other to the rotatable element. These rotating plates are held pressed onto one another under spring pre-compression.

The rotating plates have at least one lug and at least one pair of recesses which determine at least two locking positions of the rotatable element, namely a swung-in and a swung-out position.

In the case of such a bearing device spattering dirt, dust and the like could also penetrate between the rotating plates. Although that does not necessarily directly cause problems, in view of the plastic material, it is, nevertheless, preferable to counteract this phenomenon as much as possible, for the sake of smooth functioning. That is possible in the case of an embodiment in which the rotating plates each have raised parts on their surfaces facing each other, in such a way that in both locking positions the raised parts bound an enclosed space.

As a first example, each rotating plate can have at least four raised parts which are uniformly distributed in the peripheral direction, at least one first pair from two opposite raised parts being situated at a greater distance from each other than at least one second pair from the other at least two raised parts, in such a way that each first pair can be rotated past a second pair.

In order to prevent the rotatable element from being rotated too far, in such a way that it would ultimately lie in a position which is difficult to reach behind the bumper, or in a position rotated too far down, it is beneficial to provide end stops. Such end stops can be obtained if each second pair of raised parts extends in a sector shape from a central hole provided in the rotating plates. The sector parts of the rotating plates ultimately rest against each other in the extreme positions, with the result that further rotation is not possible.

The two locking positions are determined by the fact that the raised parts of each second pair bear a spherical or conical lug, and each rotating plate has at least one pair of corresponding recesses which each determine a locking position for said lug.

In a preferred embodiment, each rotating plate is circular and has two sector-shaped raised parts and also two edge parts whose internal walls determine a diameter which is at least equal to the diameter determined by the external walls of the sector-shaped raised parts. The walls of all edge parts then extend over an arc of approximately 45 degrees.

According to a further possible embodiment, each rotating plate can bear an upright ring, which rings surround each other concentrically and in a sealing manner.

The advantage of this embodiment is that the interior determined by the rotating plates and ring is well protected against moisture and dirt, thereby giving great reliability.

One ring can have lugs which are directed towards the other ring, which other ring has a recess in which the lugs can be accommodated. These lugs are situated in a "well-protected" position, on the inside of the ring with the larger diameter.

On their sides facing each other, the rotating plates also have stops, in order to limit the mutual rotating movement.

Each rotating plate can have a second ring with smaller diameter than the lower ring, which second rings fit into each other, thus forming a rotating hinge connection.

The base bearing element can also have a pin which extends through the rotatable element, which pin has a stop and bears a compression spring extending between the stop and the rotatable element, for pressing the latter towards the base element. Since the pin is preferably made of metal, in such a way that it can be welded onto the base element, which is also made of metal, rust must be guarded against here too. Rust can be avoided in an embodiment in which a bush extends around the pin and is supported on the pin by means of plastic rings.

Said pin can have a shoulder, on which the spring rests at one side, and which rests on the rotatable element at the other side.

The rotating plates can also have projections which are accommodated in the base bearing element or the rotatable element, for non-rotatably fixing the corresponding rotating plate relative to the base bearing element or the rotatable element.

BRIEF DESCRIPTION OF THE DRAWINGS

The invention will be explained in greater detail below with reference to an exemplary embodiment shown in the figures.

BRIEF DESCRIPTION OF THE PREFERRED EMBODIMENTS

Figure 1:
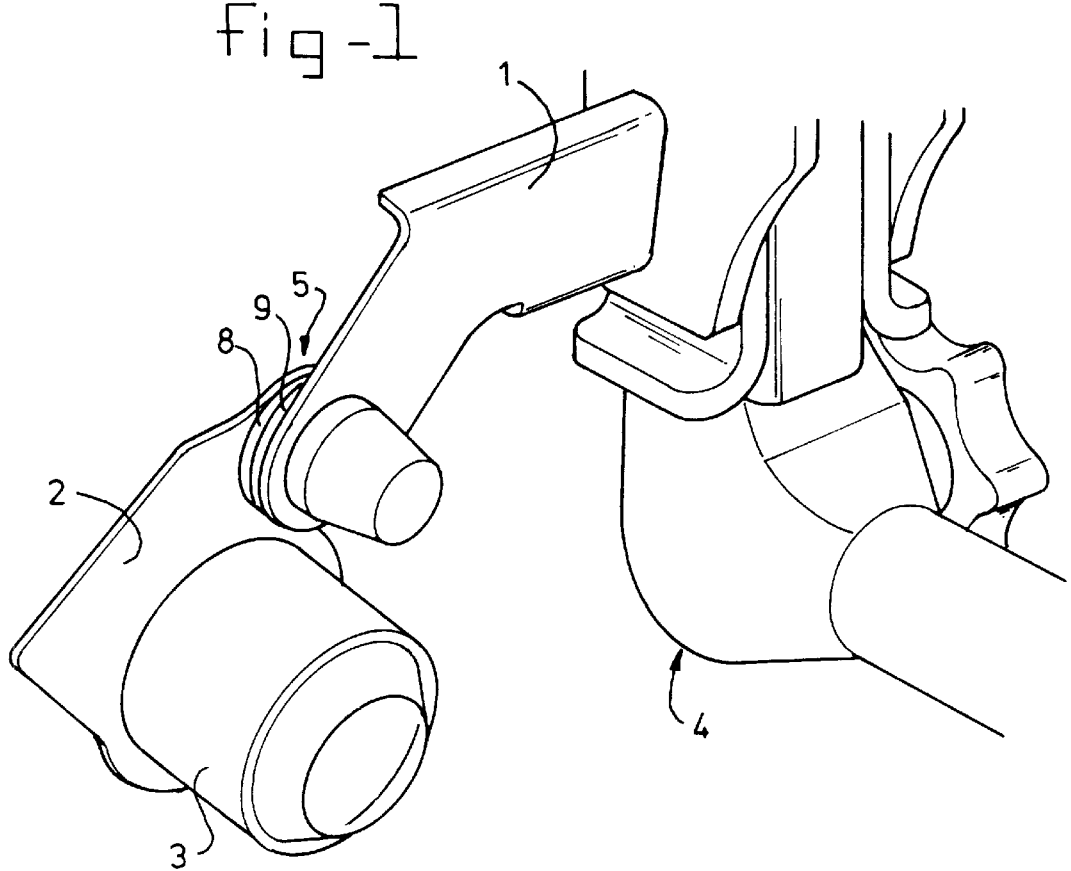
FIG. 1 shows a view in perspective of the first variant of the bearing device according to the invention.

The bearing device shown in the figures comprises a base element 1 and also a bearing element 2 which is rotatable relative thereto. A socket 3 is fitted on the bearing element, into which socket the plug of, for example, a trailer can be plugged. As can be seen in FIG. 1, the bearing device according to the invention is situated near a partially shown towing hook 4, which will not be described further.

Figure 2:
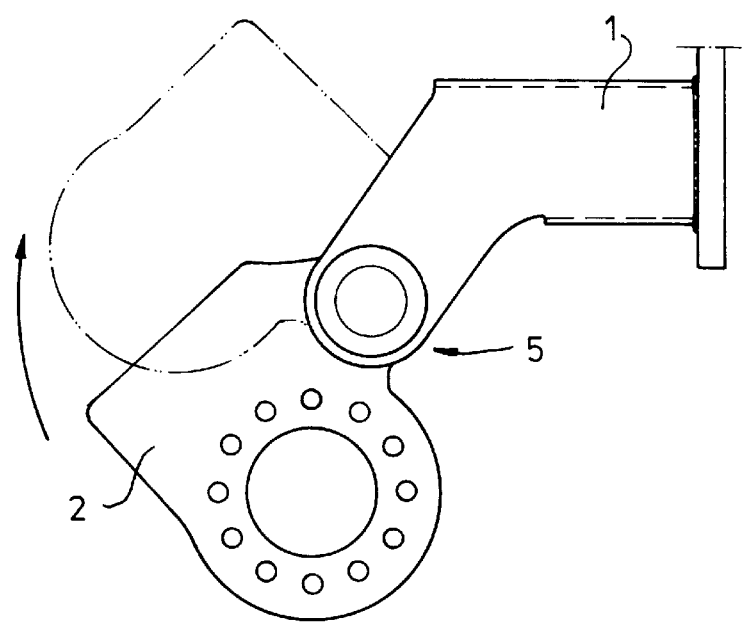
FIG. 2 shows a rear view of the device according to the invention.

The base element 1 and the bearing element 2 are connected to each other by means of a hinge indicated in its entirety by 5. As shown in FIG. 2, the rotating element 2 can be rotated between a bottom position, which is shown by solid lines in the figures, and a swung-in position, which is shown by dashed lines in FIG. 2.

Figure 3:
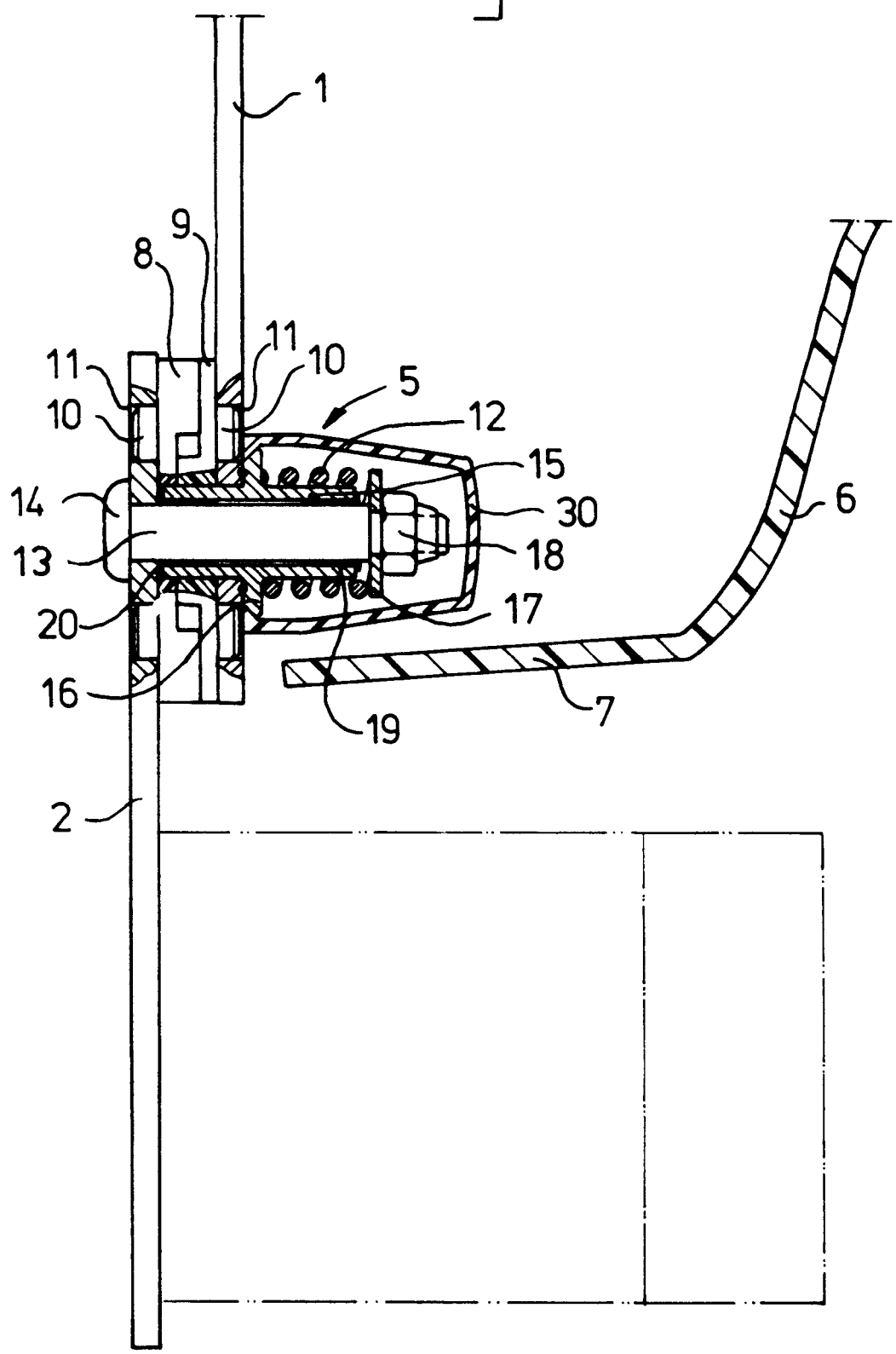
FIG. 3 shows a view in section of the device according to the invention.

In the section of FIG. 3 the position of the bearing device according to the invention is shown near rear bumper 6 of the towing vehicle. The base element 1 and the hinge are concealed at all times behind said bumper 6. In the swung-down position, the element projects from underneath the bumper, but in the swung-up position, this element is also situated behind the bumper 6. In order to make this swing-up movement possible, the bottom flange 7 of the bumper 6 is recessed at the correct point.

According to the invention, the hinge 2 has rotating plates 8, 9, one of which is fixed on the rotatable element 2, and the other on the base element 1. Each rotating plate 8, 9 has projections 10 which are accommodated in correspondingly shaped holes 11 of the rotatable element 2 and the base element 1 respectively, with the result that they are non-rotatable relative to the corresponding element.

The rotating plates 8, 9 are rotatable relative to each other and are made of plastic, in such a way that they can slide easily relative to each other and cannot be damaged during the rotating movements.

The package consisting of base element 1, the two rotating plates 8, 9 and the rotatable element 2 is held pressed onto one another under spring pre-compression of spring 12. Spring 12 is fitted around pin 13, the head 14 of which is welded onto the rotatable element 2. A bush 15, which has a shoulder 16, is also fitted around the pin 13. Spring 12 is accommodated under pre-compression between said shoulder 16 and the washer 17, which is fixed by means of nut 18 on the corresponding threaded end of the pin 13. The spring force of spring 12 is transmitted to said package by way of the shoulder 16.

The bush 15, which is immovably connected to the base element 1 by means of spot welding, is rotatably supported relative to the pin 13 by means of plastic bearing bush 19, 20. This means that here again metal contact between pin 13 and bush 15 is avoided, so that no wear as the result of the rotating movements can occur.

Figure 4:
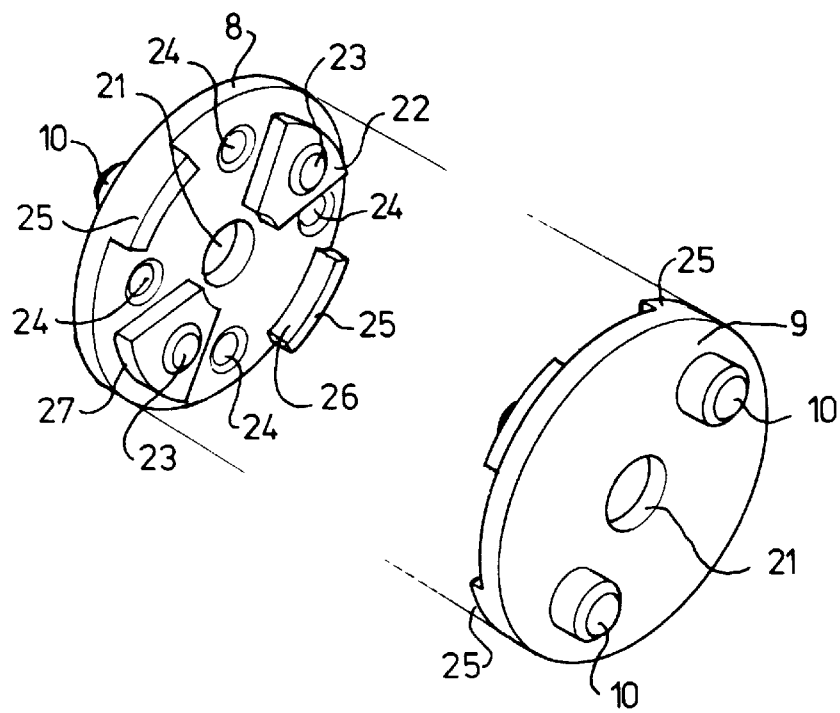
FIG. 4 shows the rotating plates in detail.

The rotating plates 8, 9 are shown in perspective in FIG. 4. They each have a hole 21, through which the pin 13 must be inserted. On their surfaces facing each other the rotating plates 8, 9 have sector-shaped raised parts 22, each bearing a lug 23. Said lugs can snap into the corresponding recesses 24 of the other rotating plate, with the result that two extreme rotation positions are determined. In the assembled state, the spring 12 ensures that the lugs 23 cannot shoot out of the recesses 24.

On their surfaces facing each other, the rotatable plates 8, 9 also have two further raised edge parts 25, which are positioned rotated through 90° relative to the sector-shaped raised parts 22. The distance between the internal surfaces 26 of the raised edge parts 25 is equal to or slightly greater than the distance between the surfaces 27 of the sector-shaped raised parts 22 facing away from each other. The raised edge parts 25 can therefore be rotated along the outside of the sector-shaped raised parts 22.

In the embodiment shown in FIG. 4 the arc over which the sector-shaped raised parts 22 and the raised edge parts 25 extend is approximately 45°. The arc angle between two adjacent recesses 24 is approximately 90°. This ensures that in any extreme rotating position of the rotating plates 8, 9 relative to each other the periphery of said rotating plates, in particular their raised parts 22 and 25, forms a continuous peripheral wall which keeps the space situated between the rotating plates 8, 9 shut off.

Furthermore, the sector-shaped raised parts form end stops which ensure that the rotating plates 8, 9 cannot be rotated further than through approximately 90° relative to each other.

Owing to the fact that in this way the interior space between the rotating plates 8, 9 can always be kept sealed relative to the environment at both extreme ends, the rotating connection, in particular the pin 13, and the bush 15 are well protected from splashing water, dust and the like.

As shown in FIG. 3, a cap 30 is fitted, in order to protect these components even further.

Figure 5:
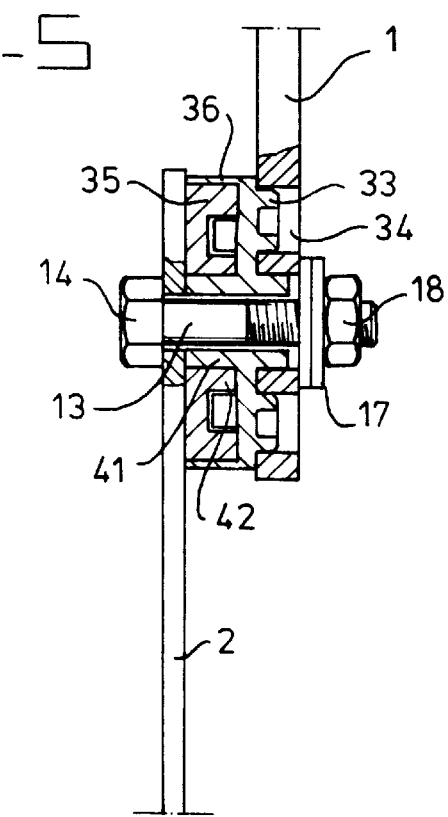
FIG. 5 shows a view in section of a second variant of the bearing device according to the invention.
Figure 6A:
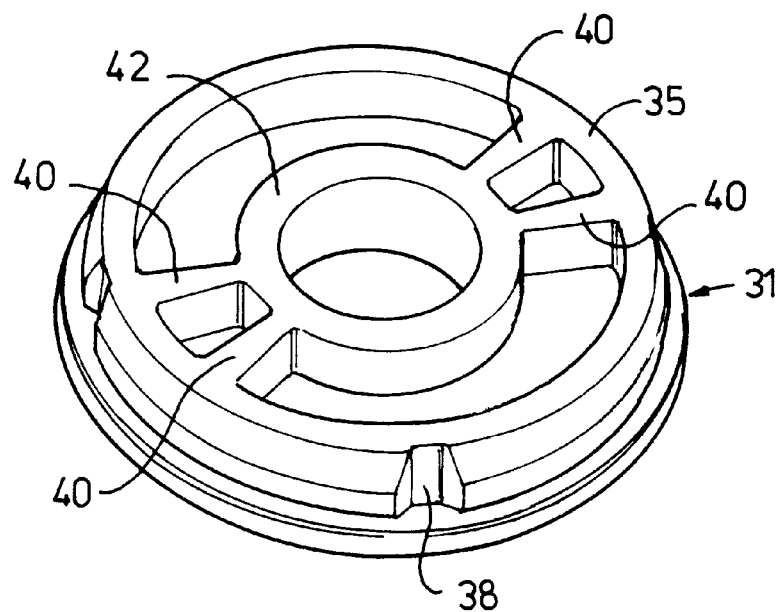
FIGS. 6a and 6b show the two variants of the rotating plates belonging to FIG. 5.
Figure 6B:
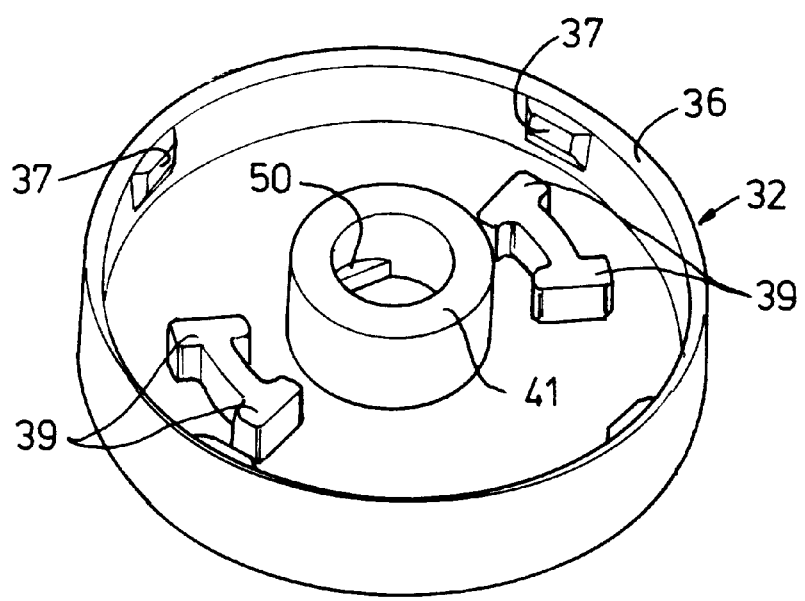
Figure 7:
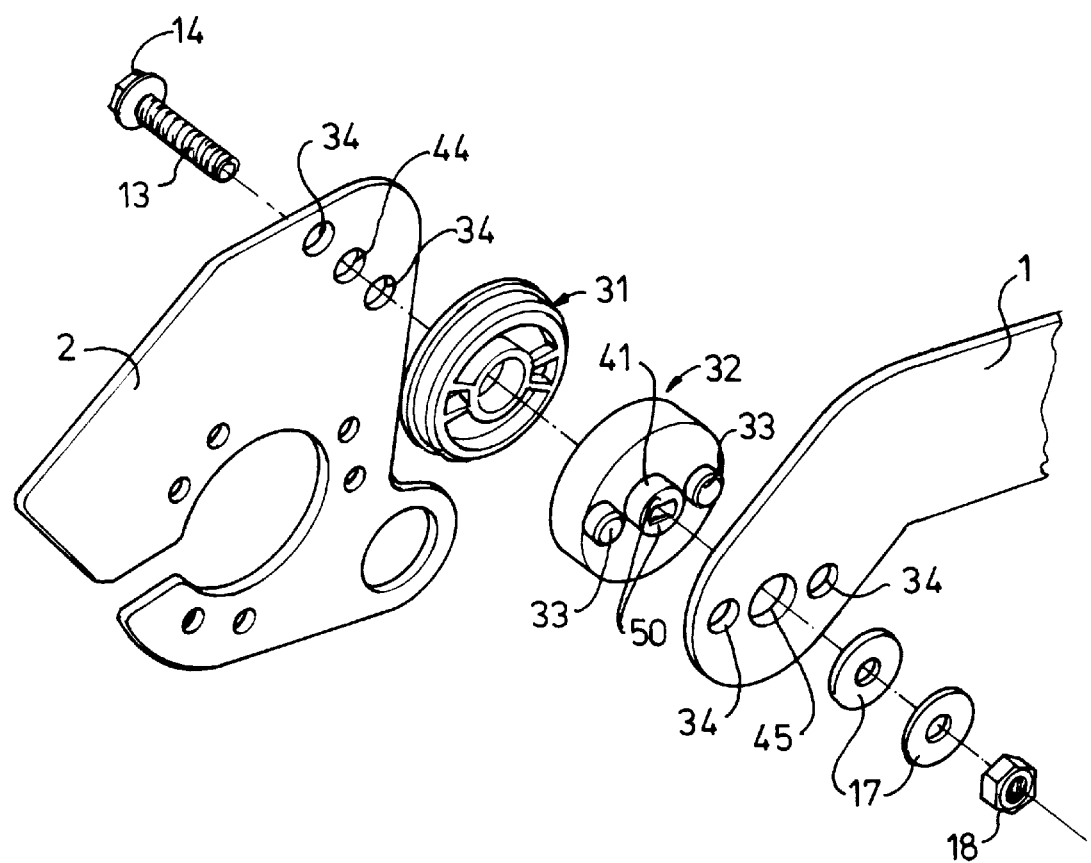
FIG. 7 shows an exploded view in perspective of the variant of FIGS. 5 and 6a, 6b.

The bearing device shown in FIGS. 5 and 7 likewise comprises a base element and a bearing element 2, on which a socket (not shown) can be fitted. In the case of this embodiment rotating plates 31, 32 are used, which plates can be wedged between the base element 1 and the bearing element 2 by means of bolt 13 with bolt head 14, two washers 17 and nut 18.

Of these two washers 17, the one resting against the base element 1 is made of metal, while the one resting against the bearing element 2 is made of plastic. This means that during the rotation no abrasive action occurs between two metals, but between a plastic and a metal part (i.e. the abovementioned washers 17). The rotation is smoother as a result, while the hole in the base element 1 is also sealed off better against dirt, and corrosion is prevented (in view of the absence of abrasion between metal parts).

Rotating plate 32 has lugs 33, as has rotating plate 31 (in the case of which the lugs are not visible), which are inserted in correspondingly shaped and positioned holes 34 in both the base element 1 and the bearing element 2. Each rotating plate 31, 32 also has an upright ring 35, 36 respectively, in such a way that ring 36 fits closely around ring 35, as can be seen in FIG. 5.

Ring 36 of rotating plate 32 has four inward projecting lugs 37, while in the external surface of ring 35 of rotating plate 31 four recesses 38 are provided.

Rotating plates 31, 32 can consequently be rotated into two stable positions relative to each other, which can be rotated through 90° relative to each other, and in both of which the lugs 37 are snapped into the recesses 38.

Rotating plate 32 also has stops 39, while rotating plate 31 has stops 40.

Finally, rotating plate 32 has a second ring 41, the external diameter of which is approximately equal to the internal diameter of the second ring 42 on rotating plate 31. When the rotating plates are fitted, these rings fall into each other in a close fit, as can be seen in FIG. 5.

The bolt 13 runs through the ring 41 of rotating plate 32 and is also inserted through the holes 44, 45 respectively of the base element 1 and the bearing element 2.

Owing to the interacting rings 35, 36 and 41, 42, the rotating mechanism consisting of the rotating plates 31, 32 is protected well against moisture, dirt and the like, in such a way that the desired effect can be ensured.

The ring 41 bears lips 50, which extend into the hole provided in the ring 41. Said lips 50 are deformed during the insertion of the bolt 13, and thereby provide resistance to the removal of the bolt 13. The result of this is that bearing element 2, rotating plates 31, 32 and bolt 13 can be used as a coherent sub-assembly.

We claim:

1. Bearing device for providing an electrical connection between a towing and a towed vehicle comprising:
   - a base bearing element which can be mounted at the level of a rear bumper on the towing vehicle,
   - a bearing element fitted with a socket which is rotatable relative to the base bearing element,
   - the base element and the rotating bearing element being interconnected by a plastic hinge,
   - the plastic hinge consisting of two parallel rotating plates, one of which is fixed to the base element, and the other is fixed to the rotatable element,
   - the rotating plates each having raised parts on their surfaces facing each other, in such a way that in locking positions the raised parts bound an enclosed space, and
   - each rotating plate having at least four raised parts which are uniformly distributed in the peripheral direction, at least one first pair from two opposite raised edge parts being situated at a greater distance from each other than at least one second pair from the other at least two raised parts, in such a way that each first pair can be rotated past a second pair.

2. Bearing device according to claim 1, wherein the rotating plates are pressed onto one another under spring pre-compression.

3. Bearing device according to claim 2, wherein the rotating plates have at least one lug and at least one pair of recesses which determine at least two locking positions of the rotatable element.

4. Bearing device according to claim 1, wherein each second pair of raised parts extends in a sector shape from a central hole provided in the rotating plates.

5. Bearing device according to claim 4, wherein the raised parts of each second pair bear a lug, and each rotating plate has at least one pair of corresponding recesses which each determine a locking position for said lug.

6. Bearing device according to claim 5, wherein each rotating plate is circular and has two sector-shaped raised parts and also two edges parts whose internal walls determine a diameter which is at least equal to the diameter determined by the external walls of the sector-shaped raised parts.

7. Bearing device according to claim 6, wherein the walls of all raised parts extend over an arc of approximately 45 degrees.

8. Bearing device for providing an electrical connection between a towing and a towed vehicle comprising:
   - a base bearing element which can be mounted at the level of a rear bumper on the towing vehicle,
   - a bearing element fitted with a socket which is rotatable relative to the base bearing element,
   - the base element and the rotating bearing element being interconnected by a plastic hinge,
   - the plastic hinge consisting of two parallel rotating plates, one of which is fixed to the base element, and the other is fixed to the rotatable element,
   - the rotating plates each having raised parts on their surfaces facing each other, in such a way that in locking positions the raised parts bound an enclosed space, and
   - each rotating plate bearing an upright ring, which rings surround each other concentrically and in a sealing manner,
   - wherein on their sides facing each other, the rotating plates have stops in order to limit the mutual rotating movement.

9. Bearing device according to claim 8, wherein one ring has lugs which are directed towards the other ring, which other ring has at least one recess in which the lugs can be accommodated.

10. Bearing device according to claim 9, wherein the lugs are situated on the inside of the ring with the larger diameter.

11. Bearing device according to claim 8, wherein each rotating plate has a second ring with smaller diameter than the other ring, which second rings fit into each other, thus forming a rotating hinge connection and
   - a pin fixed immovably on the rotatable element, which pin extends through the base element and comprises a stop and bears a compression spring extending between the stop and the base element, for pressing said base element and the rotatable element together.

12. Bearing device for providing an electrical connection between a towing and a towed vehicle comprising:
   - a base bearing element which can be mounted at the level of a rear bumper on the towing vehicle,
   - a bearing element fitted with a socket which is rotatable relative to the base bearing element,
   - the base element and the rotating bearing element being interconnected by a plastic hinge, and
   - a pin fixed immovably on the rotatable element, which pin extends through the base element and comprises a stop and bears a compression spring extending between the stop and the base element, for pressing said base element and the rotatable element together.

13. Bearing device according to claim 12, further comprising a bush extending around the pin and supported on the pin by means of plastic bearings.

14. Bearing device according to claim 13, wherein the bush has a shoulder on which the spring rests at one side, and which rests on the rotatable element at the other side.

15. Bearing device according to claim 2, wherein the rotating plates each have projections which are accommodated in holes in the base bearing element or the rotatable element, for non-rotatably fixing the corresponding rotating plate relative to the base bearing element or the rotatable element.

* * * * *